United States Patent [19]

Yamamoto

[11] 4,232,764
[45] Nov. 11, 1980

[54] APPARATUS FOR MOUNTING ELONGATED ROD-LIKE MEMBER

[75] Inventor: Masachika Yamamoto, Itami, Japan

[73] Assignee: Sumitomo Electric Industries, Ltd., Osaka, Japan

[21] Appl. No.: 927,425

[22] Filed: Jul. 24, 1978

[30] Foreign Application Priority Data

Jul. 25, 1977 [JP] Japan .................. 52-89466

[51] Int. Cl.³ .................................... F16D 65/02
[52] U.S. Cl. ............................ 188/73.6; 85/8.3; 403/155; 403/255
[58] Field of Search ............ 188/72.4, 73.3, 71.1, 188/73.6; 403/154, 155, 249, 254, 255; 85/8.3

[56] References Cited

U.S. PATENT DOCUMENTS

| 994,726 | 6/1911 | Dorman | 85/8.3 |
|---|---|---|---|
| 2,162,811 | 6/1939 | Guy | 85/8.3 |
| 2,213,884 | 9/1940 | Ohmart | 403/155 |
| 2,271,500 | 1/1942 | Rickenbach | 85/8.3 |
| 2,624,774 | 1/1953 | Cunningham | 85/8.3 |
| 3,015,248 | 1/1962 | Spurlin | 85/8.3 |
| 3,255,654 | 6/1966 | Bleicher | 85/8.3 |
| 3,268,034 | 8/1966 | Burnett | 188/73.3 |
| 3,958,411 | 5/1976 | Bernt | 403/155 |

FOREIGN PATENT DOCUMENTS

| 2542540 | 3/1977 | Fed. Rep. of Germany | 188/73.3 |
|---|---|---|---|
| 52-72065 | 6/1977 | Japan | 188/73.3 |
| 573622 | 10/1977 | U.S.S.R. | 403/155 |

*Primary Examiner*—Edward R. Kazenske
*Attorney, Agent, or Firm*—Pollock, Vande Sande & Priddy

[57] ABSTRACT

For mounting a pin on a supporting member, an axial bore is formed at one end of the pin having a stopper edge, while the supporting member has a throughhole through which the pin is inserted. A radial throughhole is formed in the pin at a position spaced from the stopper edge by a distance slightly greater than the thickness of the supporting member, the radial throughhole having an inner end open to the axial bore. A hairpin-like latch spring has two bifurcated legs which are inserted into the axial bore. One of the legs has a free end portion bent so as to be able to extend through the radial throughhole and project for a predetermined length when the spring legs have been fully inserted into the axial bore. The pin is mounted on the supporting member axially immovably through cooperation of the stopper edge and the projecting free end portion of the spring leg.

9 Claims, 12 Drawing Figures

APPARATUS FOR MOUNTING ELONGATED ROD-LIKE MEMBER

BACKGROUND OF THE INVENTION

The present invention relates to an apparatus for mounting an elongated rod-like member such as a pin, stud or shaft on a supporting member.

There are many applications in which an elongated rod-like member (hereinafter referred to as a pin for the simplification of description) is to be mounted on a supporting member. For example, in the case of a disc brake apparatus for motor vehicles such as a two-wheel motor vehicle, a pair of brake pads are disposed at opposite sides of a brake disc which is mounted rotatably with a wheel in such a manner that the brake pads are caused to bear against peripheral surface portions of the disk brake when the brake is applied. The above-mentioned brake pads are likely to be worn out and thus replacement or repair of the brake pads are frequently needed. Consequently, it will be apparently advantageous if the worn pads be easily removed without disassembling the whole brake apparatus for repair or replacement by fresh ones. To this end, there has been proposed a disc brake apparatus of a caliper type in which the pair of brake pads are swingably mounted on a pin at one respective sides and held in place through geometrical engagement with corresponding portions of the brake apparatus at other lateral sides of the pads so that they are prevented from rotation about the pin when brought into frictional engagement with the brake disc upon application of the braking effort. With such arrangement, the brake pads when worn out can be relatively easily dismounted from the brake apparatus merely by removing the pin without requiring the disassembling of the brake apparatus, whereby the procedure for replacement of the brake pads can be much facilitated. The same will apply to the case in which the fresh or repaired brake pads are mounted. On the other hand, there remains however a problem to be solved that the mounting pin has to be easily and rapidly removed from and mounted onto the brake apparatus in order to assure a rapid and simple replacement of the brake pads. Additionally, the pad supporting pin must be securely held in place so that the pin may not be accidentally removed, since otherwise there would arise a danger that the brake can no more be applied.

SUMMARY OF THE INVENTION

An object of the invention is therefore to provide an apparatus for securely mounting an elongated rod-like member such as a pin or a shaft on a supporting member in such a manner that the rod-like member once mounted may not be accidentally disengaged from the supporting member, while the rod-like member can be removed or withdrawn from the supporting member easily when the dismounting of the rod-like member is desired.

Another object of the invention is to provide a rod or pin mounting apparatus of the type mentioned just above which is particularly suited for use in a disc brake apparatus for a motor vehicle.

In view of the above and other objects which will become more apparent from the description given hereinafter, there is proposed according to an aspect of the invention a mounting apparatus for mounting an elongated rod-like member on a supporting member such as a supporting plate having a hole through which the elongated rod-like member can freely extend, an axial bore being formed in the rod-like member at one end portion at which the rod-like member is mounted on the supporting member and having an axial length slightly greater than the thickness of the portion of the supporting member at which the rod like member is mounted. A stopper edge is formed at the extremity of the rod-like member so that the stopper edge will bear against a corresponding surface of the supporting member when the rod-like member has been fully inserted into the hole formed in the supporting member. At least one radial throughhole extends from the inside of the axial bore outwardly and substantially perpendicular to the longitudinal axis of the rod-like member, the radial throughhole being formed at a position spaced from the stopper edge by a distance slightly greater than the thickness of the supporting member. A hairpin-like latch spring of a resilient material is inserted in the axial bore, the latch spring having two bifurcated spring legs, one of which has a main leg portion and a free end portion bent so as to extend substantially perpendicularly to the main leg portion, the free end portion having a length to extend through the radial throughhole and project outwardly for a certain distance to engage the side surface of the supporting member at the side opposite to the stopper edge, whereby the rod-like member is mounted on the supporting member axially immovably through cooperation between the stopper edge and the projecting free end portion of the spring leg.

It should be here mentioned that the term "elongated rod-like member or pin" is used in a broad sense to encompass a solid or hollow elongated member of circular or angular cross-sections.

Further, although the invention is particularly suited for implementation in combination with a brake apparatus such as hereinbefore described, it will be appreciated that the invention can be practiced in any other applications where facilitated rapid mounting as well as dismounting of an elongated rod-like member are desirable.

The above and other objects, novel features and advantages of the invention will become more apparent from the description on preferred embodiments of the invention. The description makes reference to the accompanying drawings.

BRIEF DESCRIPTION OF THE DRAWINGS

FIG. 2b shows the same as viewed from the upper side in FIG. 2a;

Same or similar reference numerals are used for designate same or similar parts throughout the figures.

DETAILED DESCRIPTION OF THE PREFERRED EMBODIMENTS

Figure 1:
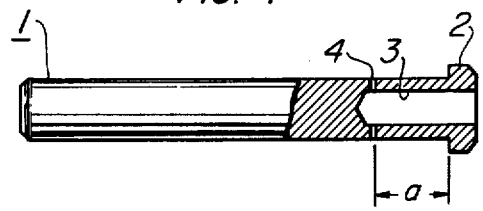
FIG. 1 is a sectional view showing an elongated rod-like member or pin which is to be mounted through a mounting apparatus according to the invention.

Referring to FIG. 1, reference numeral 1 generally denotes an elongated rod-like member which will be hereinafter referred to as pin for simplification of description and which is to be mounted on a mounting or supporting member 10 (FIGS. 3a to 3c) such as a mounting plate of a disc brake apparatus. The supporting member or mounting plate 10 is formed with a hole 11 through which the pin 1 can extend. The pin 1 has a stopper edge or a collar 2 formed integrally at one end thereof, which collar 2 is adapted to bear against a side surface of the mounting plate 10 and serves as a stopper for limiting the axial displacement of the pin 1 in coorperation with a hairpin-like latch spring, as will be described hereinafter. Obviously, the outer diameter of the collar 2 is selected to be greater than the diameter of the receiving hole 11.

Formed in the pin 1 at the end portion thereof where the collar 2 is formed is a substantially coaxially extending bore 3 having preferably a circular cross-section and a longitudinal length substantially greater than the thickness of the supporting plate 10 as measured from the rear side (left side as viewed in FIG. 1) of the collar 2. In this connection, it is to be noted that, although the pin 1 is assumed to be solid in the case of the illustrated embodiment, it is equally possible to employ alternatively a hollow pin having an inner throughhole of a diameter corresponding to that of the bore 3.

As is shown in FIG. 1, at least one radial hole 4 is formed in the pin 1 at a position spaced from the rear side of the stopper collar 2 for a distance a which is selected substantially equal to or slightly greater than the thickness of the mounting plate 10 and has a diameter sufficiently large to allow the free end portion of a latch spring to be easily inserted therethrough.

Figure 2A:
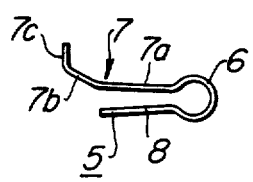
FIG. 2a is a plan view showing a latch spring used for mounting removably the pin shown in FIG. 1.
Figure 2B:
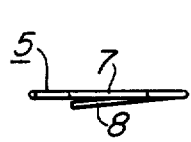
Figure 2C:
FIG. 2c is a similar view to FIG. 2b showing a modified latch spring.

The latch spring is shown in FIGS. 2a and 2b and denoted generally by reference numeral 5. As can be seen from the figures, the latch spring 5 made of a resilient material is in a hairpin-like configuration and constituted by a circular bent head portion 6 of a size greater than the diameter of the bore 3 and two bifurcated legs 7 and 8, one of which (the leg 8 in the illustrated embodiment) is formed straightly, while the other leg (the leg 7) is constituted by a straight main portion 7a, an intermediate bent portion 7b bent relative to the main portion 7a at an angle smaller than 90° and a free end portion 7c which is bent substantially perpendicularly to the main leg portion 7a and adapted to be inserted into the radial bore 4 when the pin 1 is mounted on the supporting plate 10. It is to be noted that the intermediate bent portion 7b and the free end portion 7c are bent in a direction away from the leg 8. As can be seen from FIG. 2b, the legs 7 and 8 are slightly skewed relative to each other so as to allow a maximum relative bending between the legs 7 and 8. Alternatively, the straight leg 8 may be formed shorter than the main portion 7a of the leg 7 to obtain the similar effect, as shown by 8' in FIG. 2c.

Next, referring to FIGS. 3a to 3c, description will be made how the pin 1 is mounted on the supporting plate 10. The hairpin-like latch spring 5 is first inserted into the bore 3 formed in the pin 1 until the free end leg portion 7c of the latch spring has been inserted into the radial hole 4. Such insertion may be easily accomplished by selecting the dimension of the leg 7 between the head portion 6 and the free end portion 7c substantially in conformance with the distance between the radial hole 4 and the open end of the bore 3. In the inserted state of the latch spring 5, the free end leg portion 7c will of course project outwardly from the radial hole 4.

Figure 3A:
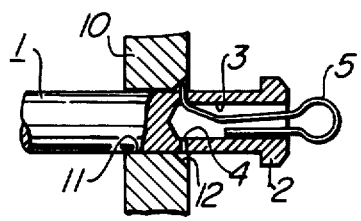
FIGS. 3a to 3c show a process for mounting the pin shown in FIG. 1 by using the latch spring shown in FIGS. 2a and 2b.
Figure 3B:
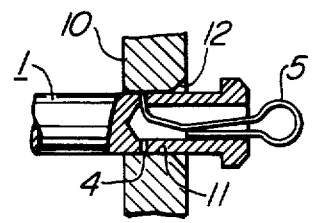
Figure 3C:
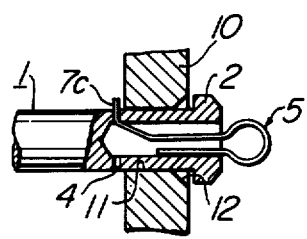

At the next step, the pin 1 having the pin 5 placed in the bore 3 is inserted into the hole 11 formed in the supporting plate 10 (FIGS. 3a and 3b). With a view to facilitating such insertion in consideration of the outwardly projecting free end portion 7c of the spring leg 7, it is preferred that a bevelled peripheral edge or flared edge 12 is formed in the throughhole 11 at the side of the supporting plate 10 from which the pin 1 is inserted. Then, the bevelled edge 12 will serve as a guide wall to gradually press down the projecting free end portion 7c of the latch spring 5 inwardly thereby to facilitate the insertion of the pin 1. When the collar 2 is brought into contact with the surface of the supporting plate 10, the free end portion 7c of the latch spring 5 is again projected outwardly through the radial hole 4 under the restoring resiliency thereof (FIG. 3c). In this state, the mounting plate 10 is located between the collar 2 and the projecting free end portion 7c of the latch spring 5, whereby the axial displacement of the pin 1 relative to the mounting plate 10 is inhibited with some tolerance. In other words, the pin 1 is now in the state mounted on the plate 10.

When the pin 1 is to be dismounted, this can be easily accomplished merely by withdrawing the latch spring 5 outwardly from the bore 3.

Figure 4:
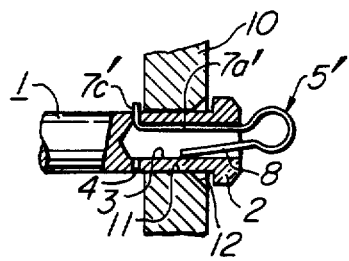
FIG. 4 is a fragmental side view showing another embodiment of the mounting apparatus according to the invention with a portion shown in section.

FIG. 4 shows another embodiment of the invention which differs from the mounting apparatus described above merely in that the intermediate bent portion 7b of the spring 5 is eliminated. Although substantially similar effects can be obtained with the structure of FIG. 4, the use of the spring 5 having the intermediate bent portion 7b as shown in FIGS. 2a and 2b is preferable as compared with the case where a latch spring 5' of FIG. 4 is used. Since a straight portion 7a' of the spring 5' shown in FIG. 4 engages over the length thereof with the inner surface of the bore 3 when the spring 5' has been inserted into the bore 3, it is a little difficult to make a free end portion 7c' projected sufficiently through the hole 4. If the length of the free end portion 7c' were made larger with a view to obtaining the sufficient projection thereof through the hole 4, the insertion of the spring 5' into the bore 3 would become difficult. Thus, intermediate bent portion 7b facilitates insertion and removal of free end portion 7c into and from radial bore 3.

Figure 5:
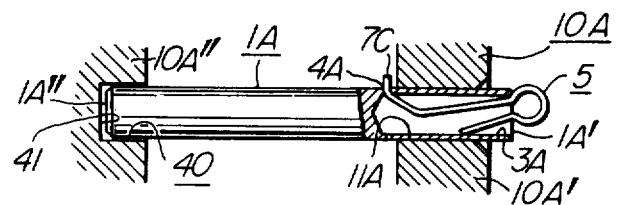
FIG. 5 is a side view showing a further embodiment of the mounting apparatus according to the invention with a portion shown in section.

FIG. 5 shows a mounting apparatus according to a further embodiment of the invention which is adapted to mount an elongated rod-like member or a pin 1A onto a supporting member 10A having a first portion 10A' and a second portion 10A". The first portion 10A' is of substantially same structure as the supporting member 10 of the previously described embodiments and has a hole 11A through which the pin 1A can extend, while the second portion 10A" is spaced from the first portion 10A' in an opposite relationship therewith. The pin 1A is formed with an axial bore 3A extending from one end 1A' of the pin 1A as well as with a radial bore 4A, as similar to the pin 1 of the previously described embodiments. However, the pin 1A is different from the pin 1 of the previously described embodiments in that the of the pin 1 is eliminated and that a second end 1A" of the pin 1A constitutes a stopper edge. The second portion 10A" of the supporting member 10A is formed with a bottomed hole 40 in line with the hole 11A formed in the first portion 10A'. The bottomed hole 40 is adapted to receive the second end 1A" of the pin 1A and has a bottom surface 41 which cooperates with the stopper edge 1A".

When the pin 1A is to be mounted, the hairpin-like latch spring 5 is first inserted into the axial bore 3A with the free end portion 7c thereof projecting through the radial throughhole 4A; then the pin 1A is inserted into the hole 11A, as similar to the previous embodiments. When the pin 1A has been fully inserted through the hole 11A, the second end 1A" of the pin 1A is received in the bottom hole 40 with the stopper edge beared against the bottom surface 41. Thus, the axial movement of the pin 1A is prevented by the cooperation between the stopper edge and the bottom surface, and between the free end portion 7c of the spring 5 and the corresponding side surface of the first portion 10A' of the supporting member 10A.

It will be understood that the hairpin-like latch spring 5' shown in FIG. 4 may be used in place of the latch spring 5 of the mounting apparatus shown in FIG. 5.

Next, description will be made of a disc type brake apparatus for a motor vehicle such as a two-wheel motor vehicle to which the mounting apparatus according to the invention can be advantageously adapted. In the disc brake apparatus of the type described hereinbefore, it is necessary that the brake pads are mounted securely so that they may not accidentally fall off due to vibrations or the like causes during the running of the vehicle and at the same time can be easily dismounted for replacement or repair when the pads have been worn out. The mounting apparatus according to the invention is particularly suited to be used for this purpose, although the apparatus can be equally employed in any other applications in which similar requirements are imposed.

Figure 6:
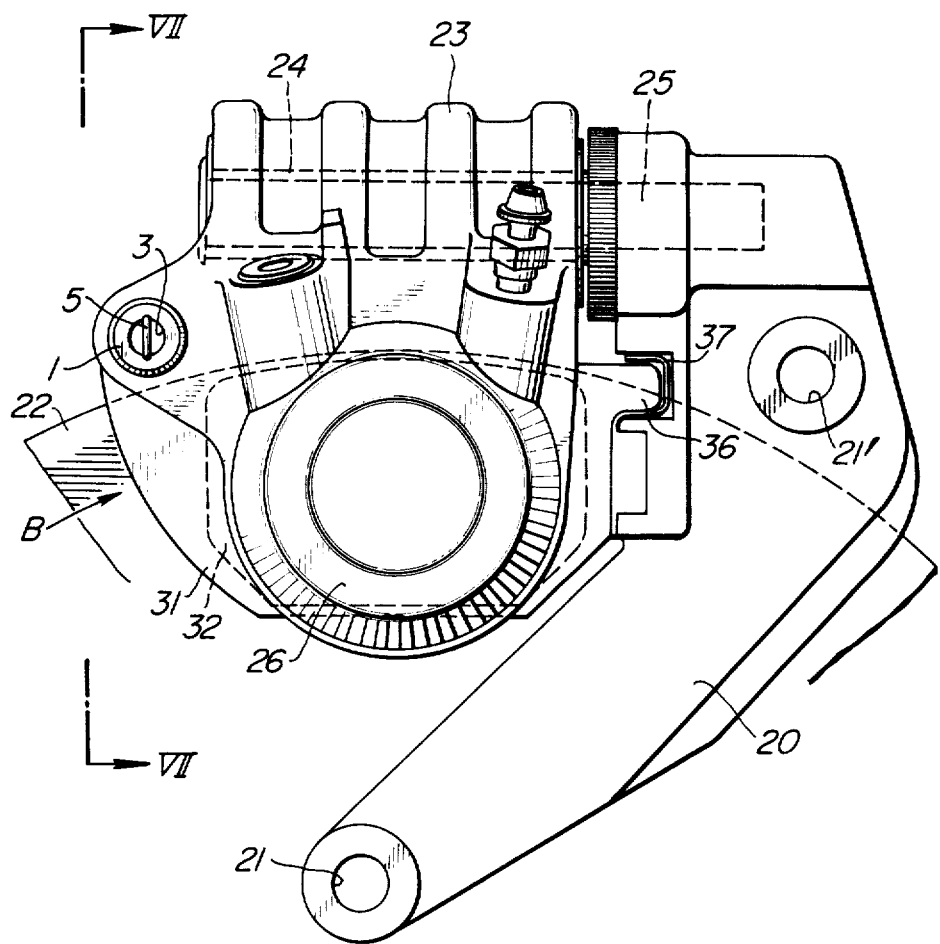
FIG. 6 is a side view showing a disk brake apparatus in which a pin mounting structure according to the invention is implemented.
Figure 7:
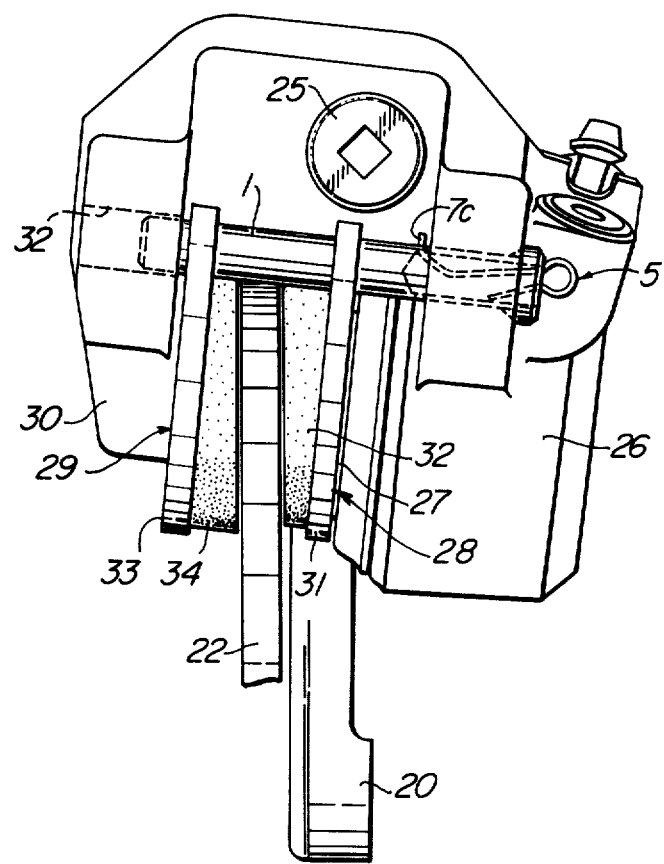
FIG. 7 is an end view, partially in phantom, of the same taken along the line VII—VII in FIG. 6.
Figure 8:
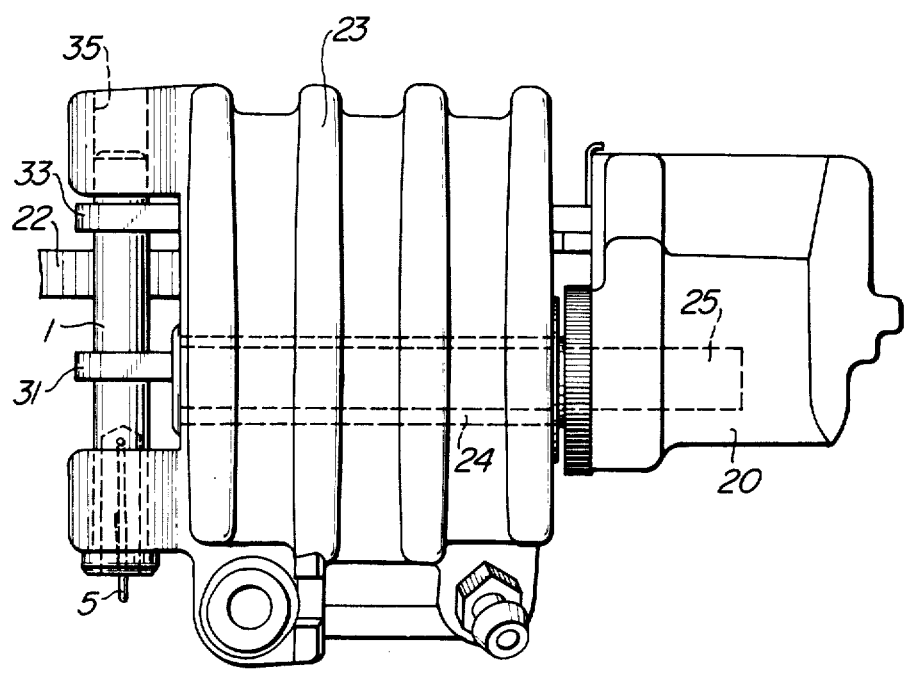
FIG. 8 is a top plan view, partially in phantom, of the same.

Now, referring to FIGS. 6 to 8 which show a typical exemplary structure of a swing type disc brake apparatus, reference numeral 20 denotes a mounting member having mounting holes 21 and 21' through which the brake apparatus is fixedly secured to a stationary part of a motor vehicle such as a bifurcated leg or fork (not shown) of a two-wheel motor vehicle by means of bolts. A brake disc 22 is mounted on an axle rotatably with an associated wheel in the direction indicated by an arrow B (FIG. 6). Disposed to straddle over the outer peripheral portion of the brake disc 22 is a caliper or brake housing 23 which is swingably mounted on a bolt 25 through an interposed eccentric sleeve 24, the bolt 25 in turn being fixedly secured to the mounting member 20. The caliper type brake housing has a depending arm portion 26 formed at one side thereof in which a hydraulic cylinder is formed to accommodate therein slidably a piston, thereby constituting a pressing device 27 (refer to FIG. 7) adapted to exert a braking pressure to a brake pad 28 (FIG. 7) under the hydraulic pressure supplied into the cylinder. When the brake pad 28 is caused to bear against the associated surface of the brake disc 22 upon application of the brake force, the arm portion 26 is caused to swing about the bolt 25 in the counter-clockwise direction as viewed in FIG. 7 under the counter force exerted by the brake disc 22, as the result of which other brake pad 29 disposed at other depending arm portion 30 is caused to be pressed against the other surface of the brake disc 22 in opposition to the brake pad 28, whereby the brake disc 22 is frictionally engaged by the brake pads 28 and 29 in a sandwiched manner. As can be seen from FIG. 7, the brake pad 28 includes a backing plate 31 and a brake lining 32, while the brake pad 29 includes a backing plate 33 and a brake lining 34. Each of the brake pads 28, 29 has to be repaired or replaced by a fresh one when the brake linings are worn out. The mounting apparatus according to the invention is used for mounting these brake pads on the brake apparatus in such manner that these pads can be easily dismounted while being prevented from the accidental falling-off during the running of vehicle. More particularly, pin 1 of the structure described hereinbefore in conjunction with FIGS. 1 to 4 is inserted into a throughhole (not shown) formed in the mounting member 20 which corresponds to the supporting plate 10 shown in FIGS. 3 and 4. The pin 1 is inserted into a hole 35 formed in the arm portion 30 of the brake housing 23. The brake pads 28 and 29 have respective holes formed at one lateral sides through which the pin 1 extends to support the pads swingably thereabout. Each of the brake pads 28 and 29 has a projection 36 formed at the other lateral side which is adapted to geometrically engage in a corresponding notch 37 formed in the brake housing 23, whereby the rotation of the brake pads 28 and 29 are prevented. The pin 1 is securely retained in the brake housing by the latch spring 5 in the same manner as described hereinbefore. Accordingly, repeated description will be unnecessary. As will be readily appreciated, the dismounting of the brake pads 28 and 29 can be easily and rapidly effected merely by withdrawing the latch spring 5 and then the mounting pin 1. On the other hand, the mounting of the fresh or repaired brake pads can be also accomplished offhand through the reverse procedure.

It will be understood that also the mounting apparatus described with reference to FIG. 5 may be applied to the disc brake apparatus.

Although the invention has been described in conjunction with the preferred embodiments, many modifications and variations will readily occur to those skilled in the art without departing from the spirit and scope of the invention.

I claim:

1. An apparatus for mounting an elongated rod-like member onto a supporting member having a hole through which said rod-like member can extend, comprising: an axial bore formed in said rod-like member at least at one end portion thereof, a stop means formed at an extremity of said rod-like member for bearing against a corresponding surface of said supporting member when said rod-like member has been fully inserted into said hole formed in said supporting member, at least one radial throughhole extending from the inside of said axial bore outwardly and substantially perpendicularly to the longitudinal axis of said rod-like member, said radial throughhole being formed at a position spaced from said stop means by a distance greater than the thickness of said supporting member, and a hairpin-like latch spring of a resilient material including two spring legs, one of which has a main leg portion, an intermediate leg portion and a free end portion, said free end portion being bent so as to extend substantially perpendicularly to said main leg portion and having the length to extend through said radial throughhole upon insertion of said latch spring into said axial bore and to project outwardly for a predetermined distance to engage a side surface of said supporting member under spring force of said latch spring, said intermediate leg portion being bent both away from the other of said spring legs and relative to both said main leg and free end portions to facilitate insertion and removal of said free end portion into and from said radial throughhole, said latch spring further including a bent head portion between said two spring legs, said head portion having a size greater than the diameter of said axial bore so that said head portion is located externally of said axial bore in position to be grasped and compressed to move said spring legs toward each other to facilitate removal of said latch spring from said axial bore after said latch spring has been placed in said axial bore at latch position, whereby said rod-like member is mounted on said supporting member axially immovably through cooperation between said stop means and projecting free end portion.

2. A mounting apparatus as set forth in claim 1, wherein said two legs of said latch spring are skewed relative to each other so as to allow a maximum possible bending of said two legs relative to each other.

3. A mounting apparatus as set forth in claim 2, wherein said one leg of said latch spring is longer than the other leg.

4. A mounting apparatus as set forth in claim 1, wherein said one leg of said latch spring is longer than the other leg.

5. An apparatus for mounting an elongated rod-like member onto a supporting member having a first portion formed with a hole through which said rod-like member extends and a second portion spaced from said first portion in an opposite relationship therewith, said rod-like member having a first and a second ends, comprising: an axial bore formed in said rod-like member to extend from said first end and having an axial length substantially greater than the thickness of said first portion of said supporting member, a stopper edge formed at said second end of said rod-like member, a bottomed hole formed in said second portion of said supporting member for receiving said second end of said rod-like member and having a bottom surface opposed to said stopper edge to cooperate therewith, at least one radial throughhole extending from the inside of said axial bore outwardly and substantially perpendicularly to the longitudinal axis of said rod-like member, said radial throughhole being formed at a position spaced from said first end by a distance greater than the thickness of said first portion of said supporting member, and a hairpin-like latch spring of a resilient material including two spring legs, one of which has a main leg portion, an intermediate leg portion and a free end portion, said free end portion being bent so as to extend substantially perpendicularly to said main leg portion and having the length to extend through said radial throughhole upon insertion of said latch spring into said axial bore and to project outwardly for a predetermined distance to engage the side surface of said first portion of said supporting member opposite to said first end under spring force of said latch spring, said intermediate leg portion being bent both away from the other of said spring legs and relative to both said main leg free end portions to facilitate insertion and removal of said free end portion into and from said radial throughhole, said latch spring further including a bent head portion between said two spring legs, said head portion having a size greater than the diameter of said axial bore so that said head portion is located externally of said axial bore in position to be grasped and compressed to move said spring legs toward each other to facilitate removal of said latch spring from said axial bore after said latch spring has been placed in said axial bore at latch position, whereby said rod-like member is mounted on said supporting member axially immovably through cooperation between said stopper edge and projecting free end portion.

6. In a disc brake apparatus for a motor vehicle including a brake disc mounted on an axle of said motor vehicle rotatably with a wheel, a bake housing positioned to straddle over said brake disc, and a pair of brake pads mounted on said brake housing and positioned at opposite sides of said brake disc so as to be caused to bear frictionally against said brake disc in opposite directions upon braking, and an apparatus for mounting a pin on said brake housing to support said brake pads comprising: an axial bore formed in said pin at one end portion thereof at which said pin is mounted on a supporting plate of said brake housing, said supporting plate being formed with a hole through which said pin extends, a stop means formed at an extremity of said pin for bearing against a corresponding surface of said supporting plate when said pin is fully inserted through said hole formed in said supporting plate, at least one radial throughhole extending from the inside of said axial bore outwardly and substantially perpendicularly to the longitudinal axis of said pin, said radial throughhole being formed at a position spaced from said stop means by a distance slightly greater than the thickness of said supporting plate, and a latch spring of a hairpin-like configuration having two spring legs, one of which has a main leg portion, an intermediate leg portion and a free end portion, said free end portion being bent so as to extend substantially perpendicularly to said main leg portion and having a length to extend through said radial throughhole upon insertion of said latch spring into said axial bore and to project outwardly for a certain distance to engage a side surface of said supporting plate under spring force of said latch spring, said intermediate leg portion being bent both away from the other of said spring legs and relative to both said main leg and free end portions to facilitate insertion and removal of said free end portion into and from said radial throughhole, said latch spring further including a bent head portion between said two spring legs, said head portion having a size greater than the diameter of said axial bore so that said head portion is located externally of said axial bore in position to be grasped and compressed to move said spring legs toward each other to facilitate removal of said latch spring from said axial bore after said latch spring has been placed in said axial bore at latch position, whereby said pin is mounted on said supporting plate axially immovably while said pin supports said brake pads movably along said pin at the opposite sides of said disc brake.

7. A mounting apparatus as set forth in claim 6, wherein said two legs of said latch spring are skewed relative to each other so as to allow a maximum possible bending of said two legs relative to each other.

8. A mounting apparatus as set forth in claim 7, wherein said one leg of said latch spring is longer than the other leg.

9. A mounting apparatus as set forth in claim 6, wherein said one leg of said latch spring is longer than the other leg.

* * * * *